Aug. 22, 1950     R. K. OSTERDAHL     2,519,848

POWER TRANSMISSION MECHANISM

Filed March 25, 1948

Inventor
Ragnar Osterdahl
by Sommers + Young
Attorneys

Patented Aug. 22, 1950

2,519,848

UNITED STATES PATENT OFFICE 2,519,848

POWER TRANSMISSION MECHANISM

Ragnar K. Österdahl, Stora Essingen, Sweden

Application March 25, 1948, Serial No. 16,973
In Sweden March 27, 1947

16 Claims. (Cl. 192—56)

This invention relates broadly to power transmission mechanisms, and more particularly to rotary mechanisms of this nature adapted to slip when the load is increased beyond a predetermined maximum or when being disengaged manually or otherwise.

It has long been common practice in mechanical constructions to design power transmission mechanisms such as cone clutches or disc friction clutches adapted to frictionally transmit power, and comprising driving and driven members having frictional interengaging means. Such mechanisms are objectionable since the transmitted power is variable within wide limits, which is mainly due to the condition of the friction surfaces which are likely to seize if they are not lubricated satisfactorily. It has also been proposed to construct power transmission mechanisms having shear pins or the like, which are easily designed to break when an overload in excess of a predetermined maximum is thrown onto the mechanism. Although a properly designed shear pin adequately serves the purpose of an overload release in many installations, such a construction requires the entire unit to be out of operation for a considerable time while the broken pin is replaced. In units where an overload is likely to occur frequently the necessary interruption of service to replace the shear pin makes such a construction impractical.

It is a primary object of the present invention to provide a simple and inexpensive power transmission mechanism which is unaffected by said drawbacks and which will occupy a minimum of space and can easily and quickly be reset after having been released, e. g. after having performed a function of releasing at a predetermined load.

It is a further object of the invention to provide an overload release which is easily and quickly adjusted to various release loads.

It is another object of the invention to provide overload or manually operated release means in a power transmission mechanism which is held in engagement by yielding or resilient means until released, e. g. at a predetermined maximum torque, and after release the said means becomes effective to hold said mechanism out of driving engagement until reset.

Still another object of the invention consists in the provision of easily adjustable means for regulating the point of slip of the driving and driven members of the power transmission mechanism.

Still another object of the invention consists in the provision of means which may be adjustable and are adapted to automatically reduce the point of slip after the mechanism has commenced revolving.

The above and other objects of the invention will appear more fully from the following description and by reference to the accompanying drawing in which similar reference characters designate corresponding parts throughout the several views.

Figure 1:
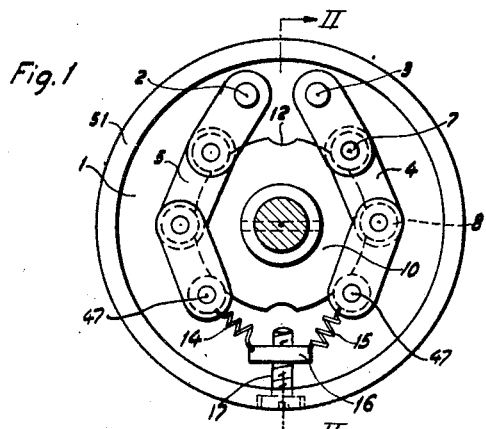
Fig. 1 is a front elevational view of an embodiment of the mechanism of the invention.
Figure 2:
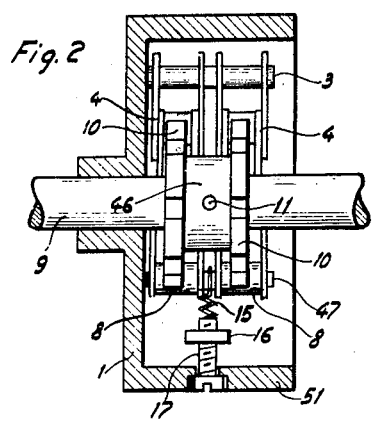
Fig. 2 is a sectional view taken substantially on the line II—II of Fig. 1.
Figure 7:
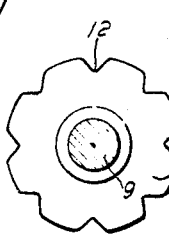
Fig. 7 is a fragmentary view, illustrating a modified embodiment of the invention.

Referring to Figs. 1 and 2 of the drawing, I designates a disc, e. g. a belt pulley, gear wheel or sprocket which is loosely mounted upon a shaft 9. Two pairs 4 and 5 of link chains are at their upper ends each pivotally connected to a pin 2 and 3, respectively, fixed to the disc 1. Each chain has a plurality of links having the same pitch and comprising pins 7 and rollers 8. Said chains form ordinary roller chains, commonly used in bicycles but also other kinds of chains may be used for the purpose. Each pair of chains 4 and 5 embraces a disc 10. The two discs 10 are formed integral with each other by a hub 46 keyed to the shaft 9 by a pin 11. The discs 10 are identical with each other. They are both formed at their peripheries with a plurality of rounded seats or recesses 12, spaced apart circumferentially so that they are each adapted to receive any one of the chain rollers 8. Thus the chain pitch and the circular pitch of the recesses 12 are equal. Instead of being rounded the recesses 12 can be V-shaped, as shown in Fig. 7. The lower ends of the chains 4 and 5 are by pins 47 secured to coiled tension springs 14 and 15, both secured to a nut 16. A screw 17 is freely inserted into the circumferential flange 51 of the disc 1 and screwed into the nut 16.

The power or torque is by means of this clutch transmitted from the disc 1 to the shaft 9 or from the shaft 9 to the disc 1 by means of the chain rollers 8 engaged by yielding pressure in the recesses or seats 12 of the discs 10. The maximum torque or point of slip is regulated by adjusting the tensions of the springs 14 and 15 by means of the screw 17 and nut 16. If the tensions of the springs 14 and 15 are unequal the slip points will be unequal in different rotary directions. This effect can also be obtained by providing the springs 14 and 15 with separate adjustable tensioning means. The change of the point of slip can also be effected by changing the shape or depth of the recesses 12, e. g. by increment or decrement of the diameter of the disc 10 on maintaining the bottom diameter of the recesses 12.

Assuming that the parts are in the position shown in Fig. 1 of the drawing, it will be evident that when the driving member, the disc 1 or the shaft 9, is rotated, the clutch rollers 8, being held in the recesses or seats 12 by the springs 14 and 15, the driven member, the shaft 9 or the disc 1, is rotated as a unit therewith to transmit power. Should a retarding overload be placed upon the driven disc 1 or the driven shaft 9 the clutch rollers 8 will ride out of the recesses 12 and roll on the periphery of the discs 10. As soon as the normal load is reestablished the springs 14 and 15 will be able to cause the rollers 8 to enter the recesses 12 and remain therein to thereby again interconnect the shaft 9 and disc 1.

A predetermined relative angular position of the discs 1 and 10 can be established by the use of chains having a varying pitch, whereby also the recesses 12 of the discs 10 should have a corresponding varying circular pitch. By this arrangement driving connection between the discs 1 and 10 will not be established unless the unequally spaced recesses 12 and rollers 8 occupy a predetermined relative position.

Figure 3:
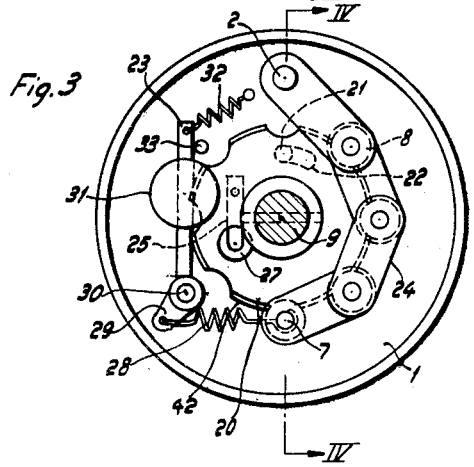
Fig. 3 is a front view of another embodiment of the invention.
Figure 4:
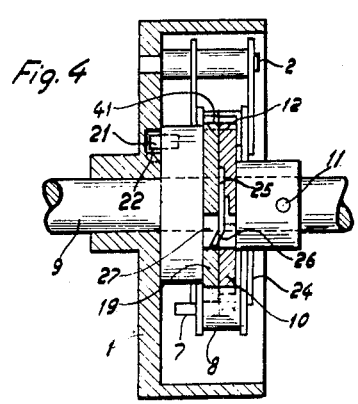
Fig. 4 is a sectional view taken substantially on the line IV—IV of Fig. 3.

In the embodiment shown in Figs. 3 and 4 a single disc 10 having the rounded recesses 12 is keyed to the shaft 9. A chain 24 is at its upper end pivotally connected to the pin 2 secured to the disc 1. To the lower end of the chain 24 is connected one end of a coiled tension spring 28 the other end of which is connected to the lower arm 29 of a lever pivotally mounted on a pin 30 fixed to the disc 1. The upper arm 23 of said lever carries a weight 31, and it is by a coiled tension spring 32 connected to the disc 1 and held in engagement with a stop pin 33 fixed to the disc 1. A clutch releasing disc 19 formed at its periphery with recesses 41 is loosely mounted on the shaft 9 between the discs 1 and 10 tightly engaging said discs. The circular pitch, configuration and size of the recesses 12 and 41 are equal, but the diameter of the disc 19 is slightly greater than that of the disc 10, so that the teeth 42 formed between the recesses 41 project radially slightly beyond the teeth 20 formed between the recesses 12. To the disc 19 is secured a pin 21 projecting into a notch 22 provided in the disc 1 and being concentric with the shaft 9. The notch 22 has such a circumferential length that relative rotary motion of the discs 1 and 19 is by the pin 21 limited to correspond to half the chain pitch. To the disc 19 is secured a blade spring 25 having a bent free end 26 which is adapted to normally project into a hole 27 in the disc 19.

Assuming that the parts are in the position shown in Fig. 3 of the drawing, that the disc 1 is the driving member and that it rotates in a counter-clockwise direction and, furthermore, assuming that the load placed onto the shaft 9 exceeds a predetermined maximum, the rollers 8 of the chain 24 will ride out of the recesses 12 in the disc 10. Thereby the disc 10 retarded by the shaft 9 will by frictional engagement retard the disc 19, so that the disc 19 turns in a clockwise direction relative to the disc 1. This relative movement of the discs 1 and 19 will be limited by the stop pin 21 moving in the notch 22 of the disc 1, so that the chain rollers 8 will rest upon the teeth 42 of the disc 19, i. e. the driving chain 24 will be completely released from the disc 10, whereby the shaft 9 is arrested. By thus automatically disconnecting the power transmitting mechanism the possibility of serious damages in the case of overload placed upon the driven parts is avoided. In order to restore the connection of the mechanism the disc 1 is arrested, and the disc 10 is turned in a counter-clockwise direction, so that the free end 26 of the blade spring 25 enters the hole 27 in the disc 19 and turns said disc in a counter-clockwise direction through an angle limited by the stop pin 21 and corresponding to half a chain pitch. Thereby the chain rollers 8 will again enter the recesses 12 of the disc 10 and restore the driving connection.

When starting this clutch the weight 31 will at a predetermined rotary velocity be thrown by the centrifugal force radially outwardly, so that the lever arm 29 is swung inwardly, whereby the tension of the spring 28 and, consequently, also the pressure of the chain rollers 8 upon their seats in the recesses 12 is decreased. Thus, when starting the mechanism it can transmit a relatively heavy load, and when revolving at full speed its point of slip has been reduced.

Figure 5:
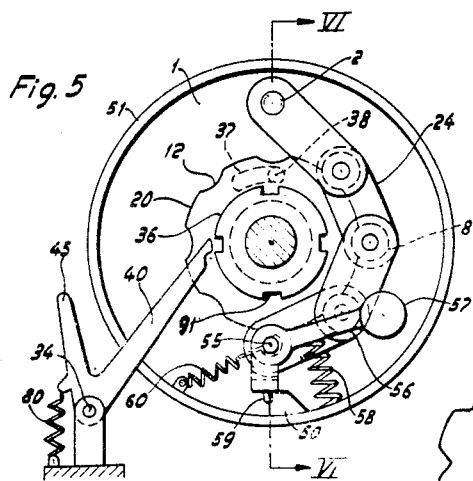
Fig. 5 is a front elevational view of still another embodiment of the invention.
Figure 6:
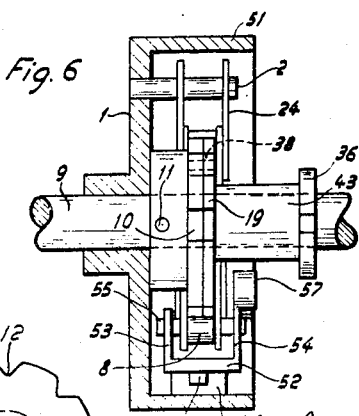
Fig. 6 is a sectional view taken substantially on the line VI—VI of Fig. 5.

Also in the embodiment shown in Figs. 5 and 6 the clutch is provided with some of the driving and driven members shown in Figs. 3 and 4, viz. the chain 24, the disc 1 loosely mounted upon the shaft 9, and the disc 10 secured to said shaft. It is assumed that the shaft 9 is driven by the disc 1 in a counter-clockwise direction (Fig. 5). The clutch releasing disc 19 is by a hub 43 formed integrally with a ratchet wheel 36 and loosely mounted on the shaft 9. In this embodiment the disc 19 has the same diameter, and it is at its periphery formed with exactly the same recesses 12 as the disc 10. The disc 19 is provided with a notch 37 concentric with the shaft 9 and having a length corresponding to half a chain pitch. Into the notch 37 projects a pin 38 fixed to the disc 10. A spring loaded latch member or dog consisting of a lever arm 40 is pivoted to a stationary pin 34 and formed integral with a hand lever arm 45, connected to a tension spring 80. The ratchet wheel 36 is at its periphery formed with recesses 91, into which the free end of the lever arm 40 can be introduced. An inwardly projecting shoulder 50 is formed integral with the flange 51 of the disc 1 and serves normally as a radial support for a bar 52. The bar 52 has a pair of radially inwardly directed arms 53 and 54 pivotally mounted on the chain pin 55. The arm 54 is formed integral with another arm 56, provided with a weight 57. A coiled compression spring 58 bearing upon the flange 51 and arm 56 has a tendency of swinging the arm 56 radially inwardly, and this movement is limited by a lug 59 projecting from the bar 52 and engaging the shoulder 59, as shown in Fig. 5. A coiled tension spring 60 interconnecting the chain pin 55 and the disc flange 51 serves to hold the chain rollers 8 by yielding pressure in the recesses 12 of the discs 10 and 19.

If the clutch is driven by the disc 1 in a counter-clockwise direction, the driving and driven members will first by the lowermost roller 8 supported by the shoulder 50 be positively interconnected to form a close coupling. When increasing the rotary speed to a predetermined number of revolutions the weight 57 will be thrown outwardly by the centrifugal force into a position limited by the disc flange 51, whereby the bar 52 is moved to the left (Fig. 5) and slips off the shoulder 50. Then the chain rollers 8 will remain in engagement with the recesses 12 of the disc 10 by yielding pressure effected by the spring 58, tending to force the pin 55 radially inwardly and by the spring 60, exerting a pulling action on the chain 24. If the stop lever 40 is moved against the ratchet wheel 36 and enters one of its recesses 41 the disc 19 is arrested and the disc 10 will rotate through half a chain pitch in a counter-clockwise direction relative to the disc 19, viz. until it is arrested by the pin 38. Thereby the chain rollers 8 are forced out of the recesses 12 of the disc 10, and the teeth 20 of the disc 19 will cover the recesses 12 of the disc 10, so that the discs 10 and 19 form a continuous circumferential rolling race for the chain rollers 8, whereby the disc 1 will rotate freely relative to the shaft 9. When the lever 40 is returned, the disc 19 will by its frictional engagement with the chain rollers 8 be rotated to slip relative to the disc 10 through an angle corresponding to half a chain pitch and limited by the stop pin 37, so that the chain rollers 8 will again enter the recesses 12 of the discs 10 and 19, whereby the driving connection is reestablished. When the rotary speed is reduced sufficiently to enable the spring 58 to reverse the arm 56 into it initial position the bar 52 will again be moved into its locking position as shown in Fig. 5.

It will be understood that the form, construction and relative arrangement of the several parts employed might be suitably varied, and therefore, the privilege of resorting to all such legitimate changes therein is reserved as may be fairly embodied within the spirit and scope of the invention as claimed. Thus, the parts constituting the various embodiments shown in Figs. 1 to 7 may be substituted one for another. In the embodiments shown in Figs. 3 to 6 a pair of discs 10 and two pairs of chains may be used, and the control and adjusting means shown in Figs. 3 to 6 may be used in the embodiments shown in Figs. 1 and 2. The control means shown in Figs. 3 and 4 may be used in the embodiment shown in Figs. 5 and 6 and vice versa.

I claim:

1. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, and yielding means interconnecting one of said end links and said primary rotatable member to enable said arcuate chain to increase its radius and thereby to enable said clutch members to yield out of said recesses.

2. In a power transmission mechanism, a primary rotatable member, a secondary rotatable member formed at its periphery with a plurality of recesses and intermediate shoulders having arcuate peripheral surfaces, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, and yielding means interconnecting one of said end links and said primary rotatable member to enable said arcuate chain to increase its radius and thereby to enable said clutch members to yield out of said recesses and ride upon said arcuate peripheral surfaces.

3. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, and yielding means interconnecting one of said end links and said primary rotatable member to enable said arcuate chain to increase its radius and thereby to enable said clutch members to yield out of said recesses, said yielding means consisting of a spring and a member interconnecting said spring and said primary rotatable member and being adapted to be displaced by centrifugal force to adjust the tension of said spring to decrease the radial pressure of said clutch members upon said secondary rotatable member in accordance with increasing rotary speed of said unit.

4. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, and a clutch disengaging member having a plurality of recesses adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and support said clutch members in positions radially beyond the recesses of said secondary rotatable member.

5. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, and a clutch disengaging member engaging said secondary rotatable member by friction and having a plurality of recesses adapted to normally face the recesses of said secondary rotatable member to receive said clutch members, said clutch disengaging member being rotatable relative to said secondary rotatable member and also being rotatable relative to said primary rotatable member to move its recesses out of engaging position relative to said clutch members and support said clutch members in positions radially beyond the recesses of said secondary rotatable member.

6. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, and a clutch disengaging member having a plurality of recesses adapted to normally face the recesses of said secondary rotatable member to receive said clutch members, said clutch disengaging member being adapted to rotatably slip relative to said secondary rotatable member and also being rotatable relative to said primary rotatable member to move its recesses out of engaging position relative to said clutch members and support said clutch members in positions radially beyond the recesses of said secondary rotatable member.

7. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and support said clutch members in positions radially beyond the recesses of said secondary rotatable member, and means for limiting rotary motion of said clutch disengaging member relative to said primary rotatable member in one direction to be less than the circular pitch of said recesses.

8. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and support said clutch members in positions radially beyond the recesses of said secondary rotatable member, and means for limiting rotary motion of said clutch disengaging member relative to said primary rotatable member in one direction to be half the circular pitch of said recesses.

9. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and support said clutch members in positions radially beyond the recesses of said secondary rotatable member, and means for limiting rotary motion of said clutch disengaging member relative to said secondary rotatable member in one direction to be less than the circular pitch of said recesses.

10. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and support said clutch members in positions radially beyond the recesses of said secondary rotatable member, and means for limiting rotary motion of said clutch disengaging member relative to said secondary rotatable member in one direction to be half the circular pitch of said recesses.

11. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and support said clutch members in positions radially beyond the recesses of said secondary rotatable member, and means for limiting rotary motion of said clutch disengaging member relative to said primary rotatable member in one direction to be less than the circular pitch of said recesses, said clutch disengaging member and said secondary rotatable member having abutments for limiting relative rotary motion of said secondary rotatable member and said clutch disengaging member when they are relatively rotated to reestablish facing positions of their recesses.

12. In a power transmission mechanism, a primary rotatable member, a secondary rotatable member formed at its periphery with a plurality of recesses and intermediate shoulders, an arcuate chain having two links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said links and said primary rotatable member to enable said arcuate chain to increase its radius and thereby to enable said clutch members to yield out of said recesses, and a clutch disengaging member having a plurality of recesses and intermediate shoulders, the recesses of said clutch disengaging member being adapted to normally face the recesses of said secondary rotatable member to receive said clutch members, said clutch disengaging member being rotatable relative to said secondary rotatable member and also relative to said primary rotatable member to move its recesses out of engaging position relative to said clutch members and cause its shoulders to support said clutch members in positions radially beyond the recesses of said secondary rotatable member, said shoulders of said clutch disengaging member projecting radially slightly beyond the shoulders of said secondary rotatable member.

13. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members and rotate together with said secondary rotatable member, and means for arresting said clutch disengaging member to cause said recesses to move out of facing position and force said clutch members out of the recesses of said secondary rotatable member and thereby to disengage the driving connection between said rotatable members.

14. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, a clutch disengaging member having a plurality of recesses adapted to normally face the recesses of said secondary rotatable member to receive said clutch members and rotate together with said secondary rotatable member, means for arresting said clutch disengaging member to cause said recesses to move out of facing position and force said clutch members out of the recesses of said secondary rotatable member and thereby to disengage the driving connection between said rotatable members, and means for limiting relative rotary motion of said secondary rotatable member and said clutch disengaging member to be less than the chain pitch.

15. In a power transmission mechanism, a primary rotatable member, a secondary rotatable member formed at its periphery with a plurality of recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, yielding means interconnecting one of said end links and said primary rotatable member to enable said arcuate chain to increase its radius and thereby to enable said clutch members to yield out of said recesses, latch means for positively engaging said clutch members in said recesses, and means for releasing said latch means in accordance with increasing rotary speed of said unit.

16. In a power transmission mechanism, a primary rotatable member, a secondary rotatable member formed at its periphery with a plurality of V-shaped recesses, an arcuate chain having two end links connected to said primary rotatable member and having a plurality of clutch members intermediate of said end links and extending circumferentially over part of said secondary rotatable member to engage said clutch members in said recesses to normally interconnect said rotatable members for rotation as a unit, and yielding means interconnecting one of said end links and said primary rotatable member to enable said arcuate chain to increase its radius and thereby to enable said clutch members to yield out of said recesses.

RAGNAR K. ÖSTERDAHL.

REFERENCES CITED

The following references are of record in the file of this patent:

UNITED STATES PATENTS

| Number | Name | Date |
| --- | --- | --- |
| 1,829,576 | Yost | Oct. 27, 1931 |

FOREIGN PATENTS

| Number | Country | Date |
| --- | --- | --- |
| 321,702 | Great Britain | Nov. 8, 1929 |
| 690,922 | France | Sept. 27, 1930 |